(12) United States Patent
Alaettinoglu et al.

(10) Patent No.: US 8,824,331 B1
(45) Date of Patent: Sep. 2, 2014

(54) SYSTEM AND METHOD FOR IDENTIFYING AN INGRESS ROUTER OF A FLOW WHEN NO IP ADDRESS IS ASSOCIATED WITH THE INTERFACE FROM WHICH THE FLOW WAS RECEIVED

(75) Inventors: Cengiz Alaettinoglu, Sherman Oaks, CA (US); Hariharan Ananthakrishnan, Sunnyvale, CA (US); Satish K Kanna, San Jose, CA (US)

(73) Assignee: Packet Design, LLC, Santa Clara, CA (US)

( * ) Notice: Subject to any disclaimer, the term of this patent is extended or adjusted under 35 U.S.C. 154(b) by 201 days.

(21) Appl. No.: 12/228,642

(22) Filed: Aug. 13, 2008

(51) Int. Cl.
*H04L 12/28* (2006.01)

(52) U.S. Cl.
USPC .......................................... 370/254; 370/392

(58) Field of Classification Search
None
See application file for complete search history.

(56) References Cited

U.S. PATENT DOCUMENTS

| | | |
|---|---|---|
| 7,450,598 B2 | 11/2008 | Chen et al. |
| 2006/0168279 A1 | 7/2006 | Lee et al. |
| 2006/0171331 A1* | 8/2006 | Previdi et al. ................. 370/254 |
| 2007/0177596 A1 | 8/2007 | Bapat et al. |
| 2007/0217419 A1* | 9/2007 | Vasseur ........................ 370/392 |
| 2007/0223486 A1 | 9/2007 | Farid et al. |
| 2007/0226630 A1 | 9/2007 | Farid et al. |
| 2008/0130515 A1* | 6/2008 | Vasseur ........................ 370/254 |
| 2008/0181217 A1 | 7/2008 | Sheppard et al. |
| 2008/0232379 A1 | 9/2008 | Mohamend et al. |

* cited by examiner

*Primary Examiner* — Chirag Shah
*Assistant Examiner* — Jenkey Van
(74) *Attorney, Agent, or Firm* — Hulsey Calhoun, PC; William Noble Hulsey

(57) ABSTRACT

A system and method collects information for VPN traffic from non edge routers that are coupled to edge routers and identifies the path the traffic took and the customer corresponding to the VPN. The system and method also identifies the ingress router coupled to the non edge router from which the traffic was collected. The system and method may assign identifiers to route targets.

15 Claims, 6 Drawing Sheets

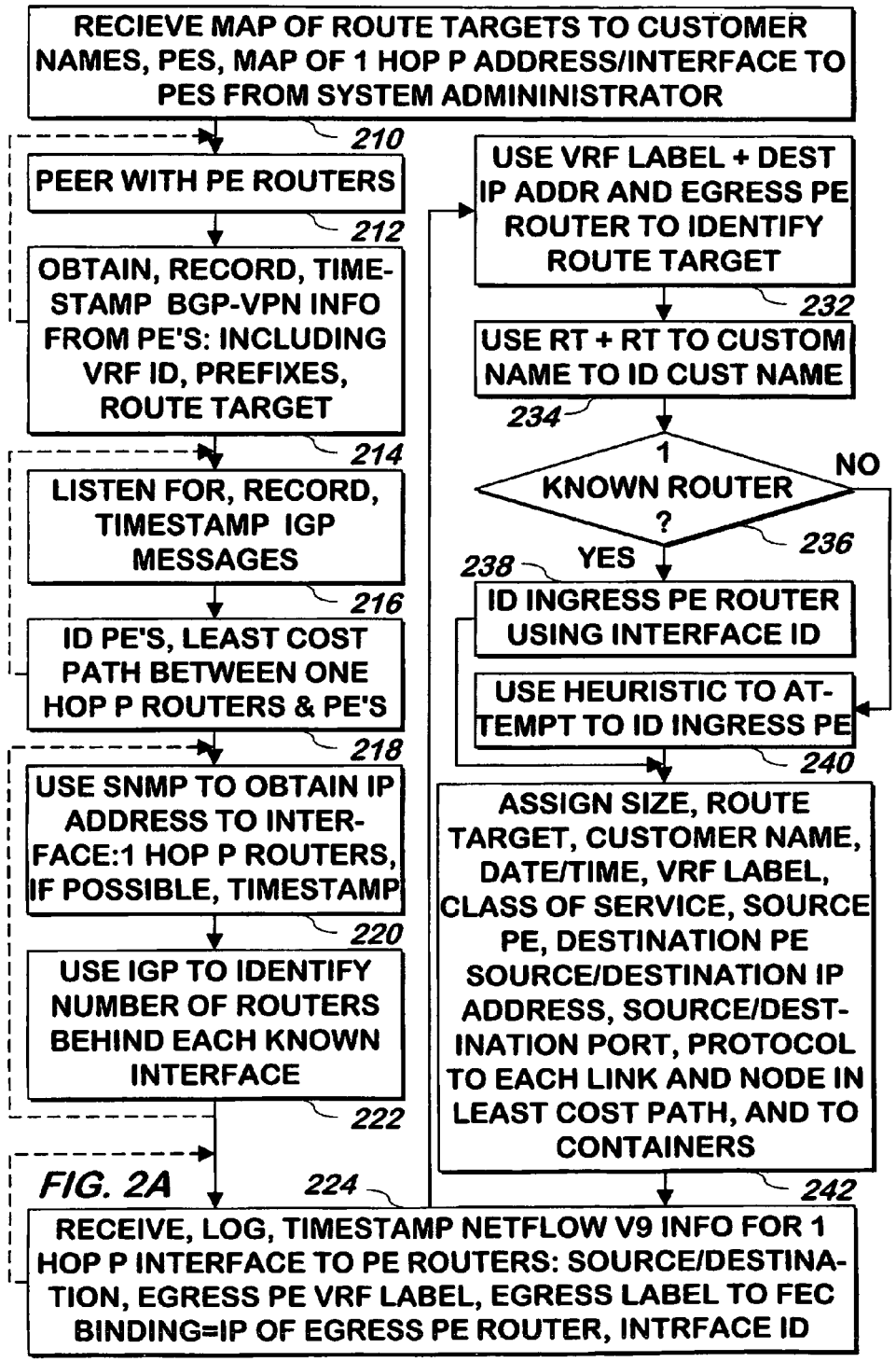

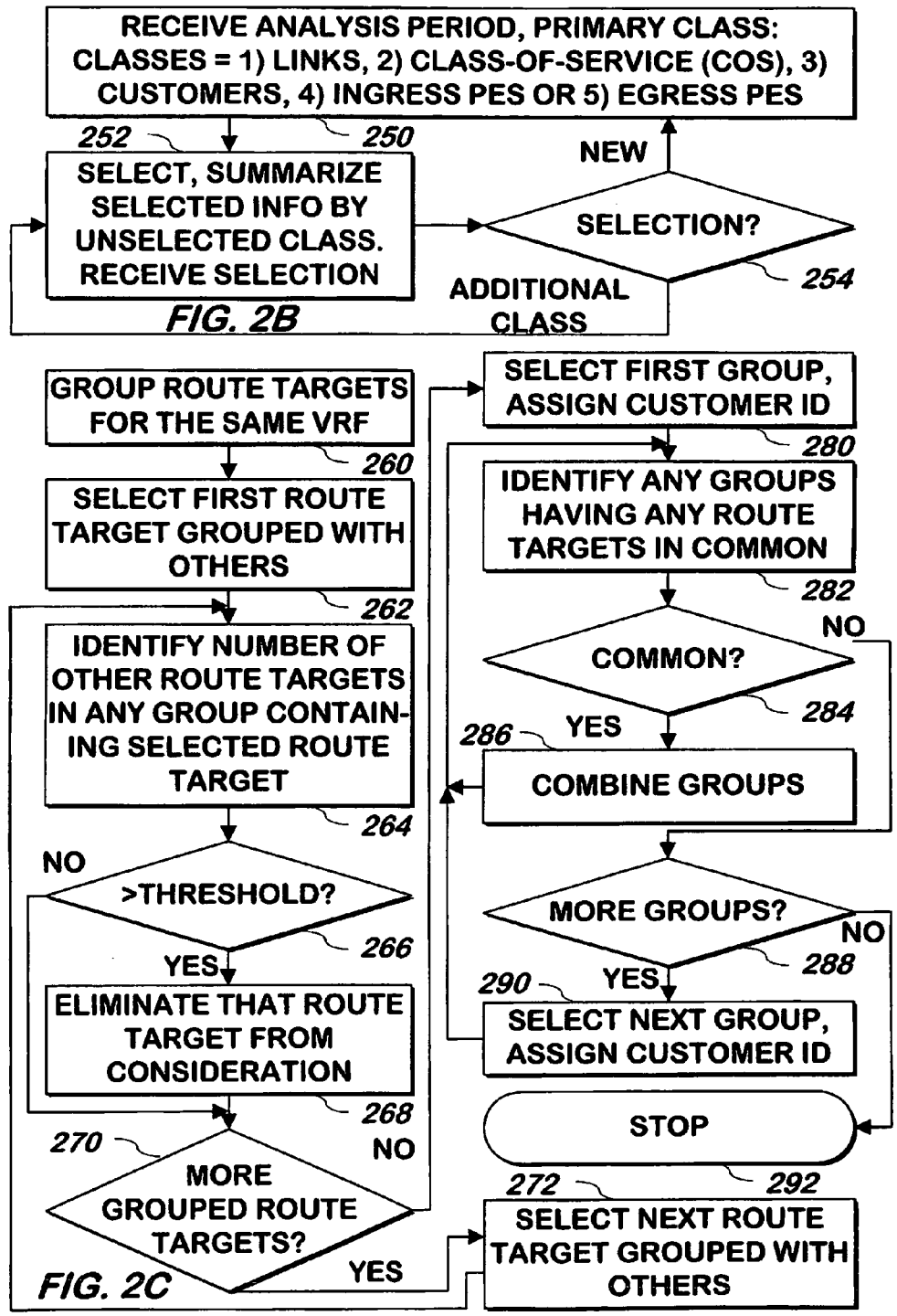

SYSTEM AND METHOD FOR IDENTIFYING AN INGRESS ROUTER OF A FLOW WHEN NO IP ADDRESS IS ASSOCIATED WITH THE INTERFACE FROM WHICH THE FLOW WAS RECEIVED

RELATED APPLICATIONS

This application is related to U.S. patent application Ser. No. 12/228,641, entitled, "System and Method for Identifying VPN Traffic Paths and Linking VPN Traffic and Paths to VPN Customers of a Provider" filed by Cengiz Alaettinoglu, Hariharan Ananthakrishnan, Constantinos Bassias, Satish Kanna, Roopesh Palasdeokar, Siddharth Taneja, Amit Yajurvedi on Aug. 13, 2008, and to U.S. patent application Ser. No. 12/228,632 entitled, "System and Method for Assigning Identifiers to Route Targets", filed by Cengiz Alaettinoglu, Hariharan Ananthakrishnan, Satish Kanna on Aug. 13, 2008, each of which has the same assignee as the present application and each of which are incorporated by reference herein in its entirety.

FIELD OF THE INVENTION

The present invention is related to computer software and more specifically to computer software for VPN network analysis.

BACKGROUND OF THE INVENTION

Networks are made up of nodes, and links that connect the nodes to one another. In a computer network, the nodes may include conventional routers, and the links may include the physical wiring that connects the routers and other nodes to one another.

Conventional networks may be made up of customer networks coupled to service provider networks. Each customer network may be managed by that customer within a single customer site. However, to connect multiple customer networks that are geographically dispersed, a service provider network may be used. The service provider network can run between the different customer sites to allow the different customer networks to be interconnected. Additionally, the service provider network may carry traffic from multiple customer networks, allowing the customers to share the facilities of the service provider.

Some customers arrange for their service providers to provide virtual private network connections within the service provider network. A virtual private network connection provides tunneled connections through the service provider network that allows the service provider to provide features to each customer that the customer desires. Such features can include high security, a certain class of service, or other features.

When a router receives a non-virtual private network (VPN) packet, the router receives the destination IP address for the packet, which is unique among destination IP addresses that may be used over the service provider network, and usually is unique among the Internet. Although the router only uses the destination IP address to determine the next hop router to send the packet, it can be desirable for network analysis to allow the network service provider to identify the entire path that the packet will take through the service provider network. The IP address in a non-VPN packet can also indicate to which customer the packet belongs, enabling analysis by customer for various network measurements.

However, when a router in a service provider network receives a VPN packet in a layer 3 VPN network operated by a service provider, the IP address may not be helpful in determining the ultimate destination of the packet, because the IP address may be an unroutable IP address that is only unique within the customer network, and may not be unique among the various customers of the service provider or the Internet. In order to determine how to route the packet, the router will receive an MPLS label corresponding to the egress PE router, the router at the edge of the provider network that will carry the traffic, that is meaningful only to the router and the router from which the VPN packet was received. However, the MPLS label is not a label for the entire tunnel, it is a label only for the portion of the tunnel between one router and the next hop router. As the packet hops through different routers, the MPLS labels used may change. This makes it difficult to determine at any point in the service provider network the exact path a packet will take because merely knowing the destination IP address and the MPLS label does not uniquely identify the destination of the packet.

The inability to discern the ultimate destination of a VPN-packet can lead to difficulties tracing problems with a provider network or performing capacity planning by the operator of the provider network. Furthermore, without knowledge of the paths the traffic is taking, it can be difficult to identify the specific customer who will use or has used a particular link or node, and it can be difficult for a provider to perform capacity planning. If a link or node will be brought down for scheduled maintenance, it can be difficult to identify the customers who will be affected.

Retrieving traffic information from the provider edge ("PE") routers at the edge of the service provider network could make it easier to identify the router from which the provider initially receives the traffic (referred to as an "ingress router), but because there may be a significant number of such PE routers, the retrieval of traffic information from such a large number of PE routers may not only be expensive, but could significantly affect network performance.

What is needed is a system and method that can identify the path, including ingress and egress routers of a layer 3 VPN packet in a service provider network shared by multiple different customer entities and identify links and nodes used by individual customers in such a network without retrieving traffic information from the PE routers, even if the identity of the ingress router is unknown and even if the identity of routers to ports of other routers is not completely available.

SUMMARY OF INVENTION

A system and method receives from a system administrator a map or table that matches route target identifiers to customer names as used by the service provider network, or a map or table may be generated that matches route target identifiers to assigned names. The system and method may also receive, for some or all of the provider edge routers (PE routers) at the edge of a service provider network a map of IP addresses of PE routers and the one or more IP addresses and interface indices of the router or routers in the provider network to which that PE router is directly connected (e.g. not through another router). The system and method then peers with the edge routers of a service provider network (referred to as "PE routers") to obtain, record and timestamp BGP-VPN information that the PE routers provide. The system and method monitors, timestamps and records IGP messages, for example, ISIS and/or OSPF messages, that all routers in the service provider network provide. The system and method then uses the IGP information to identify, for each one hop P router and every PE router, the least cost path between them. A one hop P router is a router in the service provider network that is exactly one hop from (e.g. directly connected to, not through another router) a PE router in one embodiment, or at least one hop from a PE router in another embodiment. The system and method uses conventional SNMP commands to obtain, if possible, the IP addresses of the routers connected to every interface in each one hop P router. All such information may be timestamped and stored.

The system and method retrieves NET FLOW version 9 (or above, or equivalent) information from each one hop P router interface that is directly connected to at least one PE router or in the least cost path between two PE routers, and stores and timestamps such information. Such information is retrieved for each flow, which may consist of one or more packets having a common set of source IP address, destination IP address, source port, destination port and protocol, as well as a common VRF label and common egress PE router. In one embodiment, NET FLOW information is only collected for interfaces on such one hop P routers that were received in the map of IP addresses and indices of the one hop P routers to which PE routers are directly connected, as described above. Such information may be retrieved from routers more interior to the provider network than one hop from the PE routers, but doing so can sacrifice the accuracy of the ingress PE router identification.

The NET FLOW information includes the class of service, packet count and byte count for the flow, the source and destination IP addresses and ports, the protocol, the identifier of the egress router, the VRF label for the flow on the egress router, and the start and end time for the flow.

The system and method uses the VRF label and destination IP address to look up in the BGP-VPN information retrieved from the egress router the route target for the flow, and then the map or table of route targets to customer names is used to match the flow to the customer name or other identifier using the route target. Thus, the packets in the flow are associated with the name or other identifier of the customer.

The ingress router in the service provider network is identified either using the IP address of the router associated with the interface index provided with the NET FLOW information, if known, or by attempting to discern the ingress router from those routers at the edge of the service provider network that can route through the one hop P router by looking at the characteristics of such routers. The BGP-VPN information is scanned to identify those routers that advertised a route target for a customer matching the customer identified for the flow, for any of the PE routers that route through the one hop P router from which the flow information was received. If there is one such router having all of those characteristics, that router is identified as the ingress router, and otherwise, the number of such routers is identified that advertise a destination for a route target for that customer that corresponds to the source address of the flow. If there is one such router, that router is identified as the ingress router, and otherwise, the number of routers that advertise the most specific destination address corresponding to a route target corresponding to the customer identified for the flow and the source address of the flow. If the number of such routers is one, that router is identified as the ingress router, and otherwise, the number of such routers that route through the one hop P router is identified. If there is one such router, that router is identified as the ingress PE router, and otherwise, the router from among such routers that is nearest the one hop P router is identified as the ingress PE router, or if there are several routers tied for being nearest, one is selected, for example, at random or multiple routers may be identified as the ingress router or the several routers may be associated with the flow, but the actual ingress routers listed as unknown.

A system administrator may specify the selection to be used for any set of routers that resulted in an unknown ingress router, and such selection not only replaces the unknown ingress router for the flow, but may also be used for future selection. The specification may be made on a customer by customer basis or may be used for all customers, so that the selection varies based on the customer identified for the flow.

Except as noted above, the traffic information from the NET FLOW information, including size of the flow, and class of service, and the customer identifier, and identifier of the ingress router, is then assigned to each link in the least cost path from the ingress PE router to the egress PE router, along with the timestamp.

A user can then provide an analysis period and specify an initial term, and information about the traffic timestamped during the analysis period is displayed arranged according to the initial term. The information displayed includes information regarding other terms. A user can drill down by selecting a member of the last selected term, and an additional term, and the information corresponding to the previously selected members is selected and displayed according to the most recently selected term.

In another embodiment, the raw data is collected and timestamped, and the processing described above is only performed when needed, using the information applicable at the time each flow was received.

BRIEF DESCRIPTION OF THE DRAWINGS

FIG. 2A is a flowchart illustrating a method of recording virtual private network traffic, and identifying its path and the customer to which the traffic corresponds, according to one embodiment of the present invention.

FIG. 2B is a flowchart illustrating a method of providing information about VPN traffic carried by a service provider according to one embodiment of the present invention.

FIG. 2C is a flowchart illustrating a method of assigning names to route targets according to one embodiment of the present invention.

DETAILED DESCRIPTION OF A PREFERRED EMBODIMENT

Figure 1:
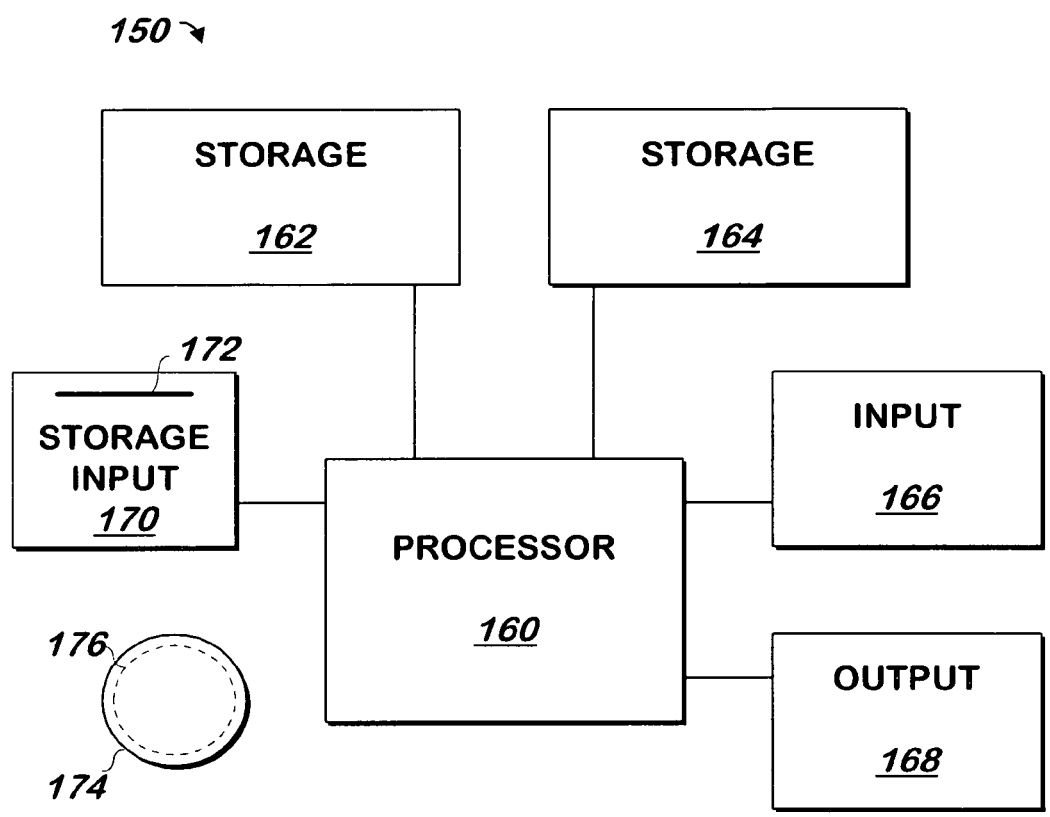
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from the MOZILLA FOUNDATION of Mountain View, Calif. or INTERNET EXPLORER browser commercially available from MICROSOFT above, although other systems may be used.

Referring now to FIG. 2, a method of recording information about virtual private network traffic, and identifying its path and the customer to which the traffic corresponds, is shown according to one embodiment of the present invention.

Route Target to Customer Name Map.

A map of route targets to customer names may be received 210 from a system administrator. The map of route targets to customer names identifies, for each route target, a customer name associated with that route target in the routers of the service provider network. In one embodiment, route targets may be an alphanumeric identifier of any length. Step 210 also may include receiving a list of IP addresses of all of the provider edge routers, known as PE routers, that operate at the edge of the service provider network. In one embodiment, provider edge routers are those routers at the edge of a provider network that are coupled to a customer router at the edge of the customer network or other router operated by a different entity not controlled or controlling the provider.

Obtain Map of Interface Indices and One Hop P Router IP Addresses to PE Router IP Addresses for which Direct Connections have been Made.

In one embodiment, step 210 includes obtaining from a system administrator or other party a map, for each of some or all of the PE routers, the IP address of such PE router, and the one hop P router address and interface to which the PE router is directly connected. (In embodiments in which information is collected from routers more interior to the provider network than the one hop P routers, the map may have the same information, but for some or all routers starting at the point of information collection and extending out to the PE routers.)

Obtain BGP-VPN Information.

Using the list of PE routers received in step 210, the PE routers are peered with 212, in order to obtain BGP information from them. BGP-VPN information is received from the PE routers through the peering arrangement, and such BGP-VPN information is timestamped and stored 214. The BGP-VPN information includes each VRF identifier corresponding to a virtual private network, and for each such VRF identifier the prefix and mask pairs associated with that VRF identifier. In one embodiment, the prefix and mask pairs define those destination IP addresses or ranges of such destination IP addresses that would correspond to the VRF identifier. Additionally, for each prefix, the route target identifier is also obtained as part of the BGP-VPN information received through the peering arrangement. In one embodiment, all such information is received in a table format that includes the VRF identifier of each VRF terminated on the provider system by that router, as well as the prefixes associated with that VRF identifier, and for each such prefix, the route target associated with that prefix. Step 214, or 212 and 214 operate as a continuously running process.

In one embodiment, step 214 includes building a map of route targets to assigned customer names, for example in embodiments in which no such map is provided as part of step 212. In one embodiment, the assigned customer names are placeholders for the real customer names, and may be assigned as Customer1, Customer2, etc. To make this assignment, the method of FIG. 2C may be used.

Referring momentarily to FIG. 2C, the route target identifiers received for the same VRF identifier are grouped 260 for each of the VRFs received with the BGP-VPN information. In one embodiment, route targets that may already have been associated with a customer name, for example, having been received in step 210, are first eliminated from consideration.

A first route target from among those grouped with any other route target in step 260 is selected 262. The number of unique route target identifiers appearing in any group with the selected route target is identified 264. It is noted that the selected route target may be in any number of groups, and so the total number of unique route targets in any other group that also contains the selected route target is identified as part of step 264. For example, if a route target A is grouped with route targets B and C in one group, and C, D and E in another group, the total unique route targets grouped with route target is B, C, D and E, which numbers 4.

If the number exceeds a threshold 266, e.g. 5, the selected route target is eliminated 268 from consideration for the remainder of FIG. 2C and the method continues at step 270. Such route targets may be administrative route targets that should not be assigned to any customer, though in one embodiment, all such route targets are assigned to a customer identifier that corresponds to administrative route targets. If the number does not exceed the threshold 266, the method continues at step 270.

At step 270, if there are more route targets grouped with other route targets, the next route target that is grouped with other route targets is selected 272 and the method continues at step 264 using the newly selected route target.

If there are no more route targets grouped with other route targets, of the remaining route targets, the first group of one or more route targets is selected and a dummy customer name is assigned to the selected group 280. In one embodiment a dummy customer name has the form CustomerN, where N is the order of assignment 1, 2, 3, etc. Other names or identifiers may be used instead of a customer name.

Any other group that has a member in common with any member of the selected group is identified 282. If there are any such group 284, those groups are combined 286, and the method continues at step 282 using the newly combined group.

If there are no such groups to combine 284, if there are more groups not selected or combined into a selected group 288, another customer dummy customer name not already assigned is assigned 290 to all route targets in the selected group or combined therewith, and the method continues at step 282. If there are not more groups not selected or combined into a selected group 288, the method terminates 292.

Each route target may thus be associated with a customer, and, using the BGP-VPN information to match routers with route targets, the routers may be associated with a customer other than by carrying traffic for that customer.

Obtain IGP Information, Least Cost Path.

IGP messages, such as OSPF and ISIS messages are listened for 216. Such IGP messages are recorded and time stamped. IGP includes any routing messages that describe routing within the service provider network, and may include conventional ISIS and OSPF messages.

PE routers are identified from the list received as described above. The list may be generated by providing a list of all routers from the topology indicated by the IGP messages and allowing a system administrator to identify those which are PE routers or the system administrator may independently generate such a list. The least cost path between each one hop P routers and the PE routers are identified 218. In one embodiment, "one hop P routers" are those routers in the provider network that are one hop away (e.g. no intervening routers) from a provider edge router. In another embodiment, one hop P routers are those routers in the provider network that are at least one hop away from a provider edge router.

If the provider edge routers are chained, so that one provider edge router routes through another provider edge router, in one embodiment, the provider edge router through which the chained provider edge router or routers route would be considered a PE router for this purpose in step 218 and only the router one hop from the innermost router in the chain would be a one hop P router, and the PE routers in the chain are not considered one hop P routers. Routers in the chain that are provider routers and provider edge routers are treated as PE routers, so the innermost router in the chain is the one hop P router for the chain. Other topologies behind a chain of two or more one hop P routers are treated as part of the chain.

In one embodiment, the least cost paths are not identified at this point in the method, and are identified only as needed for purpose of analysis using information current at the time flow information is received.

Obtain Interface to IP Address Mapping.

The conventional SNMP command language is used to obtain the IP address of each router connected to each interface of the one hop P routers, if possible, and such information is timestamped and stored 220 as part of a continuously running process. For each such router, the IGP information is used to identify the number of routers behind each such interface that are part of the provider network. For example, if a first router is connected to an interface of a second router, but a third router is daisy-chained behind the first router, all of which are in the provider network, the number of routers behind the interface is two. In one embodiment it isn't necessary to ascertain an exact number as a determination may be made whether there is one or more than one such router behind any such interface.

In one embodiment, steps 212 and 214, steps 216 and 218 and step 220 and 222 each repeat at various times as independently-winning processes as shown by the dashed lines in the Figure.

Obtain NET FLOW Information.

NET FLOW version 9 information (or a later version, or equivalent information) is received, time stamped and stored from each of the one hop P routers, in one embodiment, for interfaces that are directly connected to a PE router (and which may be chained to zero or more other PE routers) as indicated by the map received in step 210, as described above 224. In the embodiment in which NET FLOW information may be collected from routers more interior to the provider network than the one hop P routers, NET FLOW information may be collected from any interface that is coupled to a link in a least cost path from one PE router to another. Such technique may be used when the one hop P routers are one hop from the PE routers. Other embodiments may collect such NET FLOW information from other interfaces as well.

Such NET FLOW version 9 information includes for each flow, the source and destination IP addresses and ports, transport and protocol, the class of service, byte count and packet count for the flow, the egress PE VRF label for the flow, the egress PE label to FEC binding which identifies the IP address of the egress PE router, the interface index of the interface from which the flow was being received by that one hop P router, and the start and end time of the flow. In one embodiment, the NET FLOW information collected from all routers will include information about traffic from multiple different independent customers of a service provider. The customers of a service provider pay the service provider for carrying the traffic, and a service provider may carry traffic from more than one different customer, each customer being defined as a separate entity that is not under control of another customer (controlling and controlled entities would be considered one customer). Different customers may make use of the same destination IP address on a single service provider network. In one embodiment, step 224 includes calculating the packet rate and bit rate for the flow by dividing the number of packets by the amount of time between the start and end times, and dividing the number of bytes by the amount of time between the start and end times, then dividing the result by 8.

The PE label to FEC binding may not be included with the NET FLOW information. Such information may be available using the conventional LDP protocol, and in one embodiment, step 220 or step 224 includes retrieving a list of all such bindings available from LDP from the one hop P router and looking up the MPLS label of the egress PE router included with the NET FLOW information on the list to identify the binding. In such embodiment, the NET FLOW binding is used preferentially to the LDP binding information, even if received from a router on the list of routers providing the binding via LDP. Thus, in one embodiment, the LDP information is retrieved only from routers from which the binding was not received via NET FLOW. The description assumes that the binding was received from NET FLOW, however, if the binding was received from LDP, the IP address of the egress PE router will be obtained from LDP instead.

Identify Route Target, Customer Identifier.

The VRF label provided as part of the NET FLOW information and the destination IP address are compared with the BGP-VPN information from the egress PE router to identify the route target on the egress PE router 232. The route target identified in step 232 is used to look up 234 the customer name or other identifier in the route target customer name map received in step 210 or produced as described with reference to FIG. 2C.

Identify the Ingress PE Router.

Figure 3:
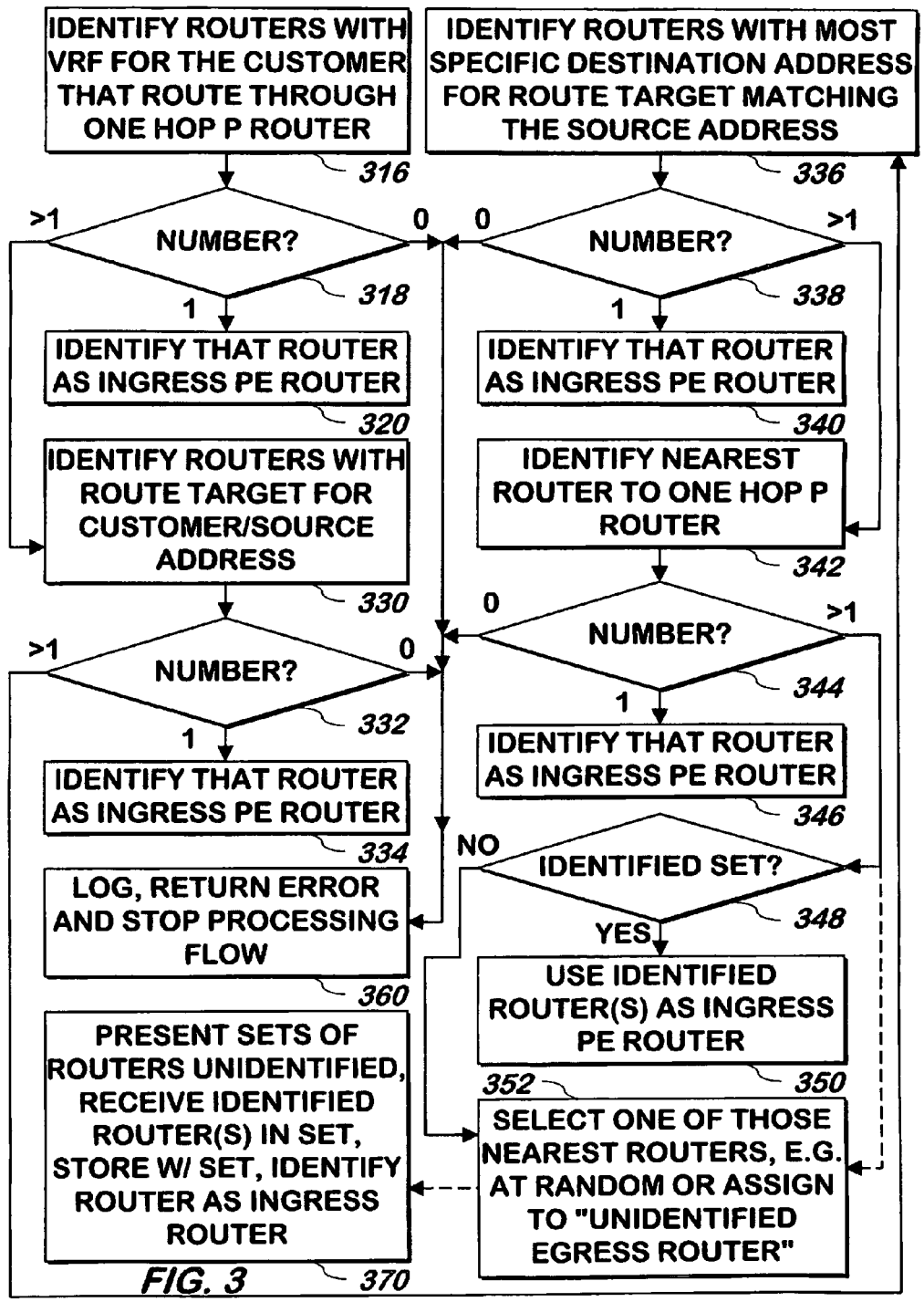
FIG. 3 is a flowchart illustrating a method of identifying an ingress PE router according to one embodiment of the present invention.

If, at step 220, the identity of the router corresponding to the interface from which the flow was received in step 224 was received via SNMP and there is only one router behind that interface 236, the ingress PE router is identified using the IP address of the router corresponding to the interface index received with the NET FLOW information 238 and the method continues at step 242. If the identity of the router corresponding interface received in step 224 is not known or there is more than one such router 236, a heuristic described below, with reference to FIG. 3 is used to attempt to identify the ingress PE router IP address 240.

Assign Information to Entities in the Least Cost Path and Other Entities.

The timestamp, packet and byte counts for the flow, the route target, the customer name or other identifier, date and time, and VRF label, class of service, the ingress PE router identifier, egress PE router identifier, source and destination IP addresses for the flow, source and destination ports and the protocol are assigned to each link and/or node in the least cost path from the ingress router to the egress router 242 and also assigning some or all of these items to containers for any item corresponding to such items, such as a container for the customer identifier or a container for the class of service, and the method continues at step 224. The size of the flow may be provided as a byte count or packet count, or byte rate or packet rate and any of these are used as the size. When assigning the items to containers, the item corresponding to the container may be omitted, for example, omitting the class of service when assigning items to a container for the class of service corresponding to the items.

In one embodiment, each link in the least cost paths identified in step 218 may be assigned an identifier as part of step 218. To assign the information above to a link consists of appending the identifiers of each link in the least cost path to a record containing the information above.

Reporting.

Referring now to FIG. 2B, a method providing traffic information about VPN traffic carried by a service provider that carries traffic from multiple service provider customers, using the information collected as described in reference to FIG. 2A, is shown according to one embodiment of the present invention.

An analysis period is optionally received and an indication of an initial class is also received 250. In one embodiment, classes may include "Links", "Class of Service", "Customers", "Ingress PE Routers" and "Egress PE Routers".

The information described above that was assigned to each node and that falls within the analysis period, and that matches all of the members of any class selected previously is selected 252. Initially, none of the members of any class have been selected so the selected information is that falling within the analysis period. Also as part of step 252, identifiers of the members of the last class selected are displayed, the selected information is summarized for the unselected classes, for each of the members of the last class selected, which in this case, is the initially selected class 252.

Thus, if a user provides an analysis period of "Today from noon until 2 pm" and selects the class "Customer", all flow information assigned to each node that was time stamped between noon and 2 pm today will be selected, and sorted by customer, which was the last class selected. Each customer is a member of the class selected. Information corresponding to each customer is then summarized for each of the classes not already selected, for example showing the number of links, numbers of classes of service, number of egress PE routers and number of ingress PE routers. Other information may be displayed for each member corresponding to the most recent class selected (which, using the example above, is each customer).

The user may then select one of the members and one of the unselected classes, or indicate that the user wishes to perform a new analysis. If the user indicates that the user wishes to perform a new analysis 254, the method continues at step 250. If the user selects one of the members and an unselected class 254, the method continues at step 252.

Continuing the prior example, if the user selected customer "Stanford University" (a customer of the service provider), and the class "links", at step 252, information assigned to nodes that had a customer identifier of "Stanford University" that was timestamped during the analysis period could be selected, identifiers of all of the links corresponding to the customer Stanford University would be displayed as members, and a summary of the selected information corresponding to the unselected classes, as well as the other information, is displayed for each link.

If the user selected one of the displayed link identifiers, and then selected the class "Egress PE Routers," information assigned to each link that was timestamped during the analysis period had Stanford University as the customer identifier, and the egress PE router selected would be selected, all of the Egress PE routers that were used by Stanford University traffic transiting the selected member link would be displayed as members, summary information for the unselected classes would be displayed for each of those displayed members, and the user could continue in this fashion.

If the user then indicated a new analysis, the user could supply an analysis period select "Links" as an initial class, and identifiers of all of the member links for which traffic was received during the analysis period would be displayed. If the user selected a link, and then selected the as yet unselected class, "Customers", the user would be able to see identifiers of all of the customers whose traffic traversed the selected link during the analysis period.

In one embodiment, as information is displayed as part of step 252, the display additionally includes a map of all the links and nodes that correspond to the selected members, and may include an animation showing the traffic traversing each link over time during the analysis period. The cumulative traffic that flowed over a link since the start of the analysis period may be represented by the thickness of the lines between each of the nodes that represent the links. As more and more traffic has flowed over a link since the start of the analysis period, the line representing that link would be displayed more thickly than other lines corresponding to links having less traffic flowing over them since the beginning of the analysis period.

It is noted that the system and method described herein identifies the path of a flow, which would include one or more packets, from an ingress router to an egress router, each at the edge of a service provider network, without recording at any edge router, information specific to the packets in the flow. Thus, performing the identification of the paths of one or more packets is performed "sineedgelessly", which means as used herein without using recorded information specific to the one or more packets from an edge router in the service provider network. The service provider network is an autonomous system under control of a single entity that operates or controls the one hop P routers from which the information specific to the packets is recorded.

Identifying the Ingress PE when the IP Address of the Router Corresponding to the Interface is not Known Referring now to FIG. 3, a method of identifying and ingress PE router for one or more packets based on an identified one hop P router is shown according to one embodiment of the present invention. The technique for identifying an ingress router described below and herein may be used when the correspondence between the interface from which a flow was received does not map to exactly one PE router, either because there are more than one PE router coupled to that interface or because the identity of the router coupled to that interface is not known.

Routers at the edge of the provider network (including routers that are configured as PE routers only in part, that can route through the one hop P router that advertise in their BGP-VPN information a route target corresponding to the customer identified for the flow as described above are identified 316 (using the table of route targets to customer names received or identified as described herein). If the number of such routers is equal to one 318, that router is identified as the ingress PE router 320.

If the number of such routers is greater than one 318, a determination is made as to the number of provider edge routers that can route through the one hop P router from which the NET FLOW information was received and having a route target corresponding to the customer identified for the flow that corresponds, in the BGP information received, to one or more destination IP addresses that match the source address from the NET FLOW data 330. If the number is equal to one 332, that router is identified as the ingress PE router 334.

If the number of such routers is greater than one 332, a determination is made as to the number of provider edge routers that can route through the one hop P router having a route target corresponding to the customer identified for the flow that corresponds to one or more destination IP addresses that match the source address from the NET FLOW data and that are the most specific, that is, the one or more with the longest mask in an address/mask pair 336. If the number is equal to one 338, that router is identified as the ingress PE router 340.

Otherwise 338, a determination is made as to the number of such routers 342 that are nearest to the one hop P router from which the NET FLOW information was received. In one embodiment, the nearest router is one that has the fewest number of hops, though in other embodiments, the nearest router has a smaller amount of a different metric, such as the smallest cost. If the number of such PE routers is one 344, that PE router is identified 346 as the ingress PE router 346.

Otherwise 344, in one embodiment, of those routers, nearest to the one hop P router, one of those routers is selected, e.g. at random and identified as the ingress PE router 352 in one embodiment, or, in another embodiment the ingress PE router is identified as an "unidentified" ingress router 352 and the set of routers nearest the one hop P router is stored along with information from the flow. Each such set of routers may be presented to a system administrator, who may select one of those routers to use as the ingress router for the flow and optionally for future flows when the same set of routers is identified in step 344 as the routers nearest the one hop P router. If the system administrator indicates that a router should be selected for the flow, that router is selected as the ingress router. If the system administrator indicates more than one router could be the ingress router for the flow, one of those routers may be selected at random and assigned as the ingress router for the flow. If the system administrator indicates that the one or more routers should be selected as the ingress router from among the same set of routers under the same circumstances for any flow in which those routers are identified as being nearest to the one hop P router, or for flows having the same customer identifier, the IP addresses of such selected routers are stored associated with the identifiers of the PE routers nearest the one hop P router, and optionally, the customer identifier of the flow.

In one embodiment, if a system administrator has previously identified one or more routers to use as the ingress router from the same set of routers nearest the one hop P router or same set of routers nearest the one hop P router for a customer identifier matching that identified for the flow as described herein 348, the router (if only one is identified) will be identified as the ingress router or one of the several routers identified from the larger set of routers will be selected at random 350 and otherwise 348, the method continues at step 352.

If, at any of steps 318, 332 or 338, the number of routers meeting the criteria is zero, the NET FLOW data may be logged, an error message is returned, and the information for that flow will not be further processed, or the traffic for the NET FLOW information may be allocated to the nodes and links between the one hop P router from which the NET FLOW information was received and the egress router associated with that NET FLOW information 360. In one embodiment, at points 332 or 338, one of the immediately preceding routers identified in the last nonzero number of routers identification may be selected at random and identified as the ingress router, or the one nearest of such routers to the one hop P router from which the NET FLOW information was received may be identified as the ingress router. In another embodiment, all may be identified as the ingress router and the traffic may be allocated among all such routers in proportion to the number of such routers.

System

Figure 4:
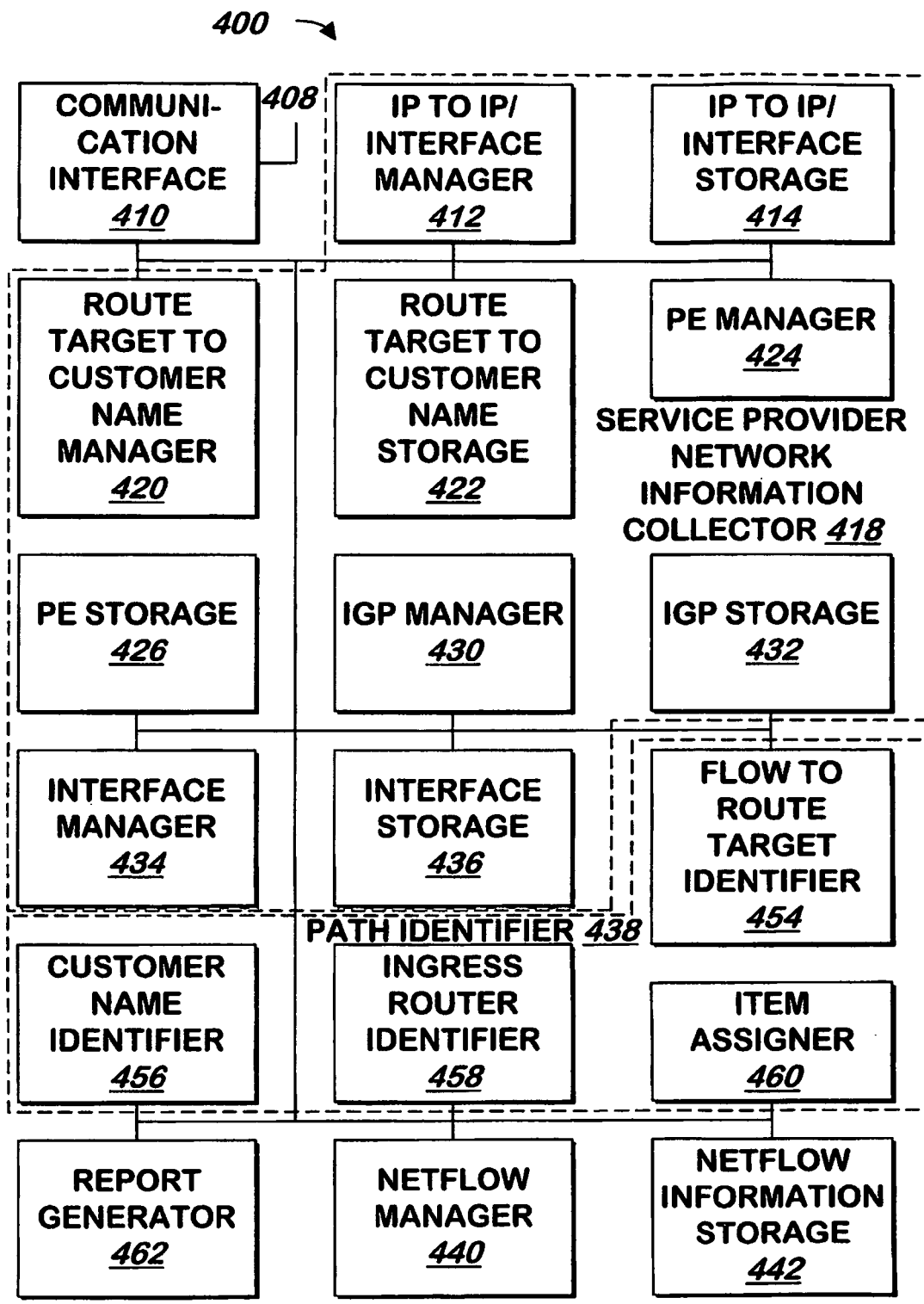
FIG. 4 is a block schematic diagram of a system for recording virtual private network traffic, and identifying its path and the customer to which the traffic corresponds. according to one embodiment of the present invention.

Referring now to FIG. 4, a system 400 for analyzing VPN traffic is shown according to one embodiment of the present invention.

System 400 includes communication interface 410 including a conventional TCP/IP-compatible communication interface running TCP/IP, Ethernet and other conventional communications protocols. All communication to and from system 400 is made via communication interface 410 coupled to a local area network such as the Ethernet, a wide area network such as the Internet, or both.

IP to IP/Interface manager 412 receives the map of IP addresses of routers to the IP addresses of routers and interfaces to which the routers are directly connected as described above, and stores the map into IP to IP/Interface storage 414.

Route target to customer name manager 420 either receives, for example, from a system administrator, a list that maps route targets to customer names as described above, or route target to customer name manager 420 identifies a list of route targets to dummy customer names as described above with respect to FIG. 2C and as described in more detail below with respect to FIG. 5. Route target to customer name manager 420 stores the list of route targets to customer names received or identified into route target to customer name storage 422. In this manner, route targets are associated with customer names independently of messages being routed using such route targets.

PE manager 424 receives a list of provider edge routers from a system administrator, and when such list is received, and when any new or changed list is received, PE manager 424 peers with the provider edge routers on the list, and periodically records into PE storage 426 the BGP-VPN information from the provider edge routers as described above, as well as a timestamp it retrieves from a system clock, not shown.

IGP manager 430 listens for, timestamps using a date and time retrieved from a system clock, and records into IGP storage 432 IGP messages from provider routers, such as ISIS and OSPF messages, into IGP storage. After a period of time such as 15 minutes, and thereafter, each time an IGP message is received, IGP manager 430 identifies the PE routers and the one hop P routers and identifies the least cost path between every one hop P router and all of the PE routers, and timestamps and stores this information into IGP storage 432. To identify the PE routers, in one embodiment, IGP manager 430 receives a list of such routers or provides the IP addresses of all routers it identifies from the IGP information it collects for a system administrator to use to identify the PE routers, and receives and stores such information in IGP storage 432.

In the embodiment in which one hop P routers may be located more than one hop from a PE router, IGP manager 430 also identifies the least cost path between every pair of PE routers and timestamps and stores this information into IGP storage 432. A least cost path may be identified using Djikstra's algorithm (also known as Shortest Path First) or using other conventional methods.

IGP manager 430 also uses the IGP messages to maintain in IGP storage 432 a list of all of the links between routers along each such path, identified using the IP addresses of each of the routers at the end of the link as well as a list of the routers.

When it identifies any new one hop P router, IGP manager 430 provides that one hop P router's IP address, or uses rules it receives from a system administrator to provide a log in address to that one hop P router, to interface manager 434, and, in one embodiment, also provides the IP addresses of the PE routers to which that one hop P router is directly connected (e.g. not through another router). IGP manager 430 also provides the IP address of each new one hop P router it identifies to netflow manager 440.

When, or shortly after, it receives such address, interface manager 434 attempts to log into the one hop P router and if it is able to log in, retrieves the mapping of IP addresses to ports for each of the directly connected PE routers, and stores the IP address of the one hop P router, as well as the interface indices for each such directly connected router and the IP address of the directly connected router on that interface. Such information is timestamped and stored into interface storage 436. In one embodiment, the log in is attempted using rules interface manager 434 received from a system administrator. Such rules may include the password to use for each range of IP addresses, and the like.

In one embodiment, interface manager 434 uses the IP address of the routers on the interfaces it collects as described above, and the IGP information in IGP storage 432 to identify whether there is one provider router or more than one provider router coupled to each interface (e.g. in a daisy chain or other arrangement), and stores in interface storage 436 such information associated with each interface index for each router for which interface information was collected as described above.

The collection of some or all of elements 412-436 may be referred to as a service provider network information collector 418, as the collect information about the service provider network, including topology information, BGP-VPN information and route target and customer name information.

Netflow manager 440 receives the IP addresses of each one hop P router and uses each address to receive from each such router the NET FLOW information described herein as it is provided by the one hop P router, for interfaces directly connected to a PE router (and which may or may not be chained to other PE routers). Such information may be continuous or occasional and will, over time report NET FLOW information from many flows. Netflow manager 440 timestamps and stores such NET FLOW information into netflow information storage 442, and provides a pointer to such information to flow to route target identifier 454. Netflow manager 440 includes the IP address of the one hop P router from which the netflow information was received, and stores it with the netflow information.

In one embodiment, netflow manager 440 uses the map in IP to IP/Interface storage 414 to identify interfaces on the one hop P routers from which the NET FLOW information should be collected, and only collects such NET FLOW information received on such interfaces. In the embodiment in which one hop P routers may be located more than one hop from a PE router, netflow manager 440 may only collect NET FLOW information from the interfaces on the one hop P routers in the least cost path between any two PE routers, as indicated by the map in IP to IP/Interface storage 414 and the best paths in IGP storage 432. Such interfaces represent the interface from which a message sent between two PE routers could potentially be received. NET FLOW information from interfaces not in any least paths is not monitored or is discarded, because it could not potentially be in a communication sent between PE routers.

When it receives the pointer, flow to route target identifier 454 identifies the route target corresponding to the pointer corresponding to the flow using the NET FLOW information stored in netflow information storage 442 as described above. To do so, flow to target identifier 454 determines if the PE label to FEC binding is part of the NET FLOW information and if not, peers with the one hop P router from which the NET FLOW information was received and uses LDP to obtain a list of MPLS labels of PE routers and bindings to those routers, then looks up on the list the MPLS label of the egress router received with the NET FLOW information to obtain the binding. Then, flow to route target identifier 454 locates the VRF label and destination IP address provided as part of the NET FLOW information from the BGP-VPN information of the egress PE router stored in PE storage 426 to identify the route target having that VRF label and a range of addresses that includes that NET FLOW information destination on the egress PE router. Flow to route target identifier 454 provides the pointer and the route target it identified, to customer name identifier 456.

When it receives the pointer and the route target, customer name identifier 456 identifies the customer name using the list of route targets to customer names in route target to customer name storage 422. Customer name identifier uses the pointer to store the route target and customer name associated with the NET FLOW information corresponding to the pointer in netflow information storage 442, and provides the pointer to ingress router identifier 458.

When it receives the pointer, ingress router identifier 458 identifies the ingress router either using the IP address of the one hop P router and the interface index from the NET FLOW message corresponding to the pointer in netflow information storage 442 and the interface information for that one hop P router in interface storage 436, if such interface information is available and, in one embodiment, only one provider router is coupled to that interface as described above. Otherwise, ingress router identifier 458 uses the heuristic described above, and below, with reference to FIG. 6, to identify the ingress router. Ingress router identifier 458 stores into netflow information storage 442 the identifier of the ingress router associated with the NET FLOW information corresponding to the pointer it receives, and provides the pointer to item assigner 460.

When it receives the pointer, item assigner 460 assigns the traffic information from the netflow information corresponding to the pointer to each of the links and/or nodes in the least cost path that was in effect at the time the netflow information was received in IGP storage 432 and to various containers in IGP storage 432 that correspond to the items of information in the NET FLOW information or derived from it as described herein. In other embodiments, if there are multiple least cost paths during the duration of the flow, the traffic is assigned to the links or nodes in each path in proportion to the amount of time the path was used, relative to the time of the flow, and then item assigner 460 assigns the traffic assigned to each path, to the links and/or nodes in the path in IGP storage 432.

To assign the traffic to a link or node or container, the pointer received is assigned to each of the links and nodes in the path in IGP storage 432 and to containers that are either stored in IGP storage 432 or added to IGP storage by item assigner 460. In another embodiment, the identifiers of each link to which the netflow data should be applied, and the amount of traffic to apply to that link is stored associated with the netflow information in netflow information storage 442. In one embodiment, netflow information storage 442 includes conventional memory or disk storage, and may include a conventional database.

Some or all of elements 454-460 are part of path identifier 438, which collectively identifies the path of the packets corresponding to the NET FLOW information received as described above, some or all of such packets being part of one or more VPN sessions, different sessions corresponding to different customers.

Reports.

At any time, a system administrator may request reports from report generator 462, which provides the requested report using the information in IGP storage 432 and netflow information storage 442 as described above. For example, if the requested report is "traffic for all links during a period", report generator 462 identifies for each link, the pointers to netflow data that apply to the time period, and, for each link, totals the traffic over the time period and displays the IP addresses of the end nodes of the link and the traffic for that node as a link. Other means of providing the same information as requested may be used. If the system administrator clicks on one of the displayed links, report generator 462 displays the other classes that can be displayed (class of service, customers, ingress PEs or Egress Pes) and if the system administrator selects customers, report generator 462 identifies the traffic for the customer over the link corresponding to the clicked on link on the report, and displays, for each customer whose traffic traversed the link during the period, the name or dummy name of the customer, and the amount of traffic corresponding to that customer on the link corresponding to the clicked link during the period specified for the report. Other reports as described above may be provided in a similar fashion.

Assigning Dummy Customer Names to Route Targets.

Figure 5:
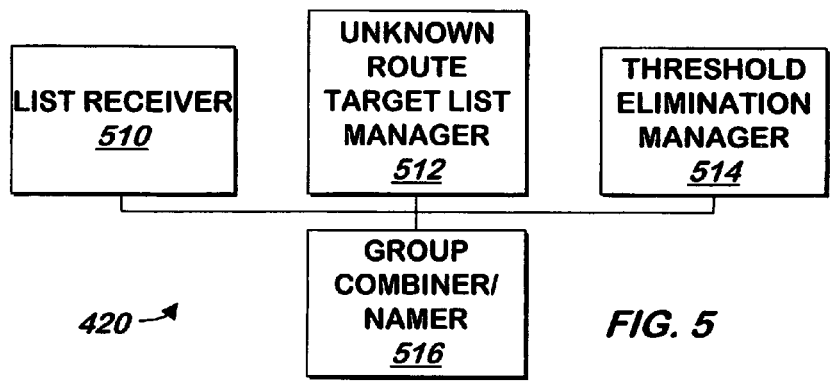
FIG. 5 is a block schematic diagram of a system for assigning names to route targets according to one embodiment of the present invention.

FIG. 5 is a block schematic diagram illustrating route target to customer name manager 420 of FIG. 4 in more detail according to one embodiment of the present invention. Route target to customer name manager may include a system for assigning dummy names to route targets as described herein. A "dummy name" is a placeholder for an actual name. Referring now to FIGS. 4 and 5, list receiver 510 receives the list of route targets to customer names from the system administrator and stores it into route target to customer name storage 422 as described above.

Unknown route target list manager 512 marks as eliminated in PE storage 426 any route targets that were received on a list stored in route target to customer name storage 422 and signals threshold elimination manager 514.

When signaled, threshold elimination manager 514 performs steps 262-272 of FIG. 2C using route targets in PE storage 426 having the same VRF as a single group, using only route targets not marked as eliminated. To eliminate route targets as part of step 268, threshold elimination manager 514 marks in PE storage 426 the route targets as eliminated in route target to customer name storage 422. When it has completed the above procedure, threshold elimination manager signals group combiner/namer 516.

When signaled, group combiner/namer 516 performs steps 280-292 of FIG. 2C on the route targets in PE storage 426 not marked as eliminated. In one embodiment, combinations of groups are performed logically, rather than physically, for example, by assigning group identifiers. Group combiner/namer 516 adds the route targets and dummy customer names to route target to customer name storage 422 for use as described herein. In one embodiment, each dummy customer name is any identifier not already stored in target to customer name storage 422.

Heuristic to Identify Ingress Routers.

Figure 6:
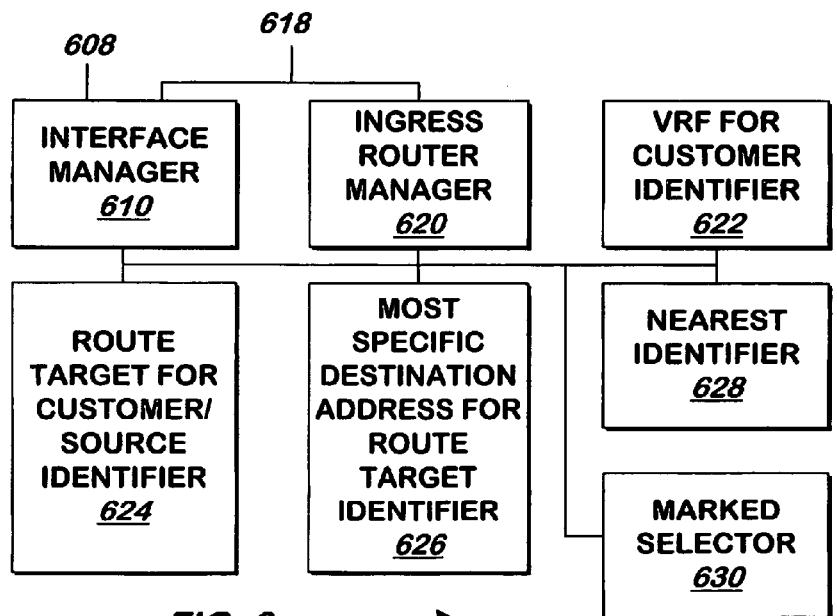
FIG. 6 is a block schematic diagram of a system for identifying one or more ingress routers for a flow according to one embodiment of the present invention.

Referring now to FIG. 6, an ingress router identifier 458 of FIG. 4, which identifies an ingress router, is shown in more detail according to one embodiment of the present invention. The technique for identifying an ingress router described below and herein may be used when the correspondence between the interface from which a flow was received does not map to exactly one PE router, either because there are more than one PE router coupled to that interface or because the identity of the router directly connected to that interface and other routers chained or otherwise connected or coupled behind that router, is not known.

Interface manager 610 receives the pointer via input 608, which is an input of ingress router identifier 458 as described above, and attempts to identify the ingress router on the interface to which the NET FLOW information corresponding to the pointer corresponds using information about the interface of the one hop P router stored in PE storage 426. If the identity of the ingress router is available, interface manager 610 provides the IP address of such ingress router at an output coupled to output 618 of ingress router identifier 458. If the information about the interface of the one hop P router is not available in PE storage 426, interface manager 610 provides the pointer to ingress router manager 620.

When it receives the pointer, ingress router manager 620 provides the pointer to VRF for customer identifier 622, which identifies the number of routers for which a VRF having a route target in PE storage 426 that corresponds to a route target for the customer in route target to customer name storage 422 matches the customer name or identifier corresponding to the NET FLOW information pointed to by the pointer in netflow information storage 442 is stored in PE storage 426 that also routes through the one hop P router corresponding to such netflow information. It is noted that the route target is identified independently of packets that are actually routed, such identification being made based on the information collected as described herein. The routers that route through the one hop P router are also identified independently of packets actually routed, such routing being determined from the least cost paths stored in IGP storage that were identified from the IGP information collected as described herein and were in effect at the time the NET FLOW information was received.

If there is one such router, VRF for customer identifier 622 provides its IP address to ingress router manager 620 and otherwise, indicates to ingress router manager 620 the number (including 0) of such routers, and marks any routers it identified in IGP storage 432, for example by associating the pointer with the router in IGP storage 432.

If ingress router manager 620 receives the IP address of a router, it provides at output 618 the IP address of the router as the ingress router as described above. Otherwise, if the number of routers received is greater than zero, it provides the pointer to route target for customer/source identifier 624.

When it receives the pointer, route target for customer/source identifier 624 identifies the marked routers having, in PE storage 426, one or more destination IP addresses that match the source address from the NET FLOW data corresponding to the pointer. If only one such router exists, route target for customer/source identifier 624 unmarks any marked routers corresponding to the pointer and provides the identifier of such router to ingress router manager 620, and otherwise unmarks those routers not identified by it, leaving as marked the routers it identified, and provides the number of identified routers to ingress router manager 620.

If ingress router manager 620 receives the IP address of a router, it provides at output 618 the IP address of the router as the ingress router as described above. Otherwise, if the number of routers received is greater than zero, it provides the pointer to most specific destination address for route target identifier 626.

When it receives the pointer, most specific destination address for route target identifier 626 identifies from among the routers marked with the pointer it receives, the routers that match the source address from the NET FLOW data with the most specific destination address in PE storage 426, that is, the one or more with the longest mask in an address/mask pair. If only one such router exists, most specific destination address for route target identifier 626 unmarks the routers marked with the pointer and provides the IP address of that router to ingress router manager 620, and otherwise, provides the number of such routers to ingress router manager 620 and unmarks any of the marked routers it did not identify, leaving as marked the routers it identified.

If ingress router manager 620 receives the IP address of a router, it provides at output 618 the IP address of the router as the ingress router as described above. Otherwise, if the number of routers received is greater than zero, it provides the pointer to nearest identifier 628.

When it receives the pointer, nearest identifier 628 identifies the marked router or routers nearest to the one hop P router corresponding to the pointer as described above, using the routing information in IGP storage 432. If there is only one such router, nearest identifier 628 unmarks all of the routers marked with the pointer and provides the one identified router's IP address to ingress router manager 620, and otherwise, unmarks those routers it does not identify, leaving marked the routers it identified, and indicates the number of routers it identified to ingress router manager 620.

If ingress router manager 620 receives the IP address of a router from nearest identifier 628, it provides at output 618 the IP address of the router as the ingress router as described above. Otherwise, if the number of routers received from nearest identifier 628 is greater than zero, it provides the pointer to marked selector 630.

In one embodiment, when it receives the pointer, marked selector 630 selects one of the marked routers as described above, for example, at random, unmarks them, and provides the IP address of the selected router to ingress router manager 620, which provides the IP address of the router as the ingress router as described above.

Ingress router manager 620 provides the IP address of the ingress router as described herein via an output, which is coupled to an output 618 of the ingress router identifier 458.

In one embodiment, ingress router manager 620 provides the IP address of the ingress router by adding it to the NET FLOW information corresponding to the pointer in netflow information storage 442 and provides the pointer to item assigner 460.

In one embodiment, if ingress router manager 620 receives one of the counts above that is zero, ingress router manager 620 does not add the identifier of the ingress router to the NET FLOW and does not provide the pointer to item assigner 460. Ingress router manager 620 may mark the NET FLOW information corresponding to the pointer as having an unidentified router so that such information may be searched to allow such information to be analyzed separately.

In one embodiment, if no ingress router is identified, ingress router manager 620 still provides the pointer to item assigner 460, which assigns traffic corresponding to the pointer to the links and nodes from the one hop P router to the egress router and to the containers for the various items as described herein. In another embodiment, if a device 624, 626 identifies zero routers, it provides the IP addresses of all marked routers to ingress router manager 620 before unmarking them, and ingress router manager 620 assigns all of them as the ingress router, and item assigner 460 divides the traffic among each such ingress router when assigning the traffic from the NET FLOW information corresponding to the pointer to each link, node and/or container as described above. In still another embodiment, ingress router manager 620 selects one such router at random, stores it associated with the NET FLOW information as the ingress router and provides the pointer to item assigner 460.

In one embodiment, when marked selector 630 receives the pointer, marked selector 630 checks an internally stored list of sets of routers for which one or more routers has been identified as the ingress router to use when such a set remains as described herein. If the marked routers match any set on the list, marked selector 630 identifies if any of the matched sets are also associated with a customer identifier. If so, marked selector 630 identifies if the customer identifier corresponding to the pointer matches the customer identifier for any of the matched sets. If so, marked selector 630 selects from among an indicated one or more of such routers on the list, unmarks all of the routers, and provides to ingress router manager 620 the identifier of that selected router. If not, marked selector 630 stores the pointer and the set of one or more marked routers as unidentified, unmarks them, and indicates to ingress router manager 620 that the flow is unassigned. Ingress router manager 620 will indicate that no ingress router is assigned, and item assigner 460 will proceed as described above. In one such embodiment, a unique identifier of a nonexistent placeholder router is assigned by marked selector and provided by marked selector 630 to item assigner 460 via ingress router manager 620. Marked selector 630 stores the identifier of the nonexistent placeholder router associated with the set of one or more marked routers. Item assigner 460 adds a node and a link to the one hop P router for the placeholder router to IGP storage 432 as described above and assigns the traffic from the flow as if the placeholder router was the ingress router, but indicates in IGP storage 432 that the placeholder router is a nonexistent router. When report generator 462 generates the reports, it flags such nonexistent routers to indicate that the actual ingress router is unknown.

At any time, a system administrator may log into a user inter interface provided by marked selector 630, which provides the information from the pointer and the identifiers of each set of routers. The system administrator may identify one or more of the routers to be indicated as the router to use, either as the ingress router, or as one of a smaller set of routers that should be used for the random selection described above. It is noted that the system administrator may indicate that all routers in the set can be used for the random selection, so that the set of such routers need not be repeatedly identified and so that a placeholder router need not be used when such set is encountered in the future. The system administrator may also indicate that the one or more routers should only be identified or used for the random selection in the future if the customer identifier matches one or more of the customer identifiers that have been stored associated with the same set of routers as described above. The system administrator may indicate that the same or a different set or subset of such routers are to be used for each customer identifier. Marked selector 630 stores such information for use as described above. In one embodiment, marked selector 630 identifies any placeholder routers that were stored corresponding to the routers in a set and eliminates those that do not correspond to any customer identifiers selected by the system administrator as described above, selects the set of routers corresponding to the placeholder it stored, uses the pointer to identify the customer, identifies the one or more routers or one or more routers for the customer as indicated by the system administrator, selects one at random if there are more than one, and provides the placeholder router identifier and the identifier of the selected router and an indication that the placeholder router should be replaced with the identified router to ingress router manager 620. Ingress router manager 620 forwards such information to item assigner 460, which reassigns the traffic from the flow to the identified router and link from that router to the one hop P router instead of the placeholder router, and removes the placeholder router and associated containers from IGP storage 432. Marked selector 630 uses the information from the system administration for future selections as described above, and indicates that the identifier of the placeholder router is available for reuse.

What is claimed is:

1. A method of identifying from a plurality of candidate ingress provider edge routers, at least one ingress provider edge router of at least one packet, comprising:

after at least one packet has been sent through at least a part of a network, said part through which said at least one packet has been sent sharing traffic from a plurality of customers, identifying at a computer system coupled to the network, a customer corresponding to the at least one packet, before identifying at the computer system said at least one ingress provider edge router of the network used to transport the at least one packet;

identifying at least one router of the plurality of candidate ingress routers as corresponding to the customer, independently of packets routed by the at least one router;

responsive to a number of the at least one of the plurality of candidate ingress routers corresponding to the customer independently of packets routed by the at least one router being one, identifying said one of the plurality of candidate ingress routers corresponding to the customer, independently of packets routed by the at least one router as the ingress provider edge router;

additionally comprising, responsive to the number of the at least one of the plurality of candidate ingress routers corresponding to the customer independently of packets routed by the at least one router being more than one:

identifying a number of the at least one of the more than one routers that have a route target for said customer corresponding to an address of the at least one packet; and responsive to the number of the at least one of the more than one routers that have the route target for said customer corresponding to the address of the at least one packet being one, identifying said one of the plurality of candidate ingress routers corresponding to the customer independently of packets routed by the at least one router, and having a route target for said customer corresponding to the address of the at least one packet, as the ingress provider edge router;

additionally comprising, responsive to the number of the at least one of the more than one routers that have the route target for said customer corresponding to the address of the at least one packet being more than one:

identifying a number of the at least one of the more than one routers that have a route target for said customer corresponding to a most specific address of the at least one packet; and responsive to the number of the at least one of the more than one routers that have the route target for said customer corresponding to the most specific address of the at least one packet being one, identifying said one of the plurality of candidate ingress routers corresponding to the customer independently of packets routed by the at least one router, and having a route target for said customer corresponding to the most specific address of the at least one packet, as the ingress provider edge router.

2. The method of claim 1, additionally comprising, responsive to the number of the at least one of the more than one routers that have the route target for said customer corresponding to the most specific address of the at least one packet being more than one:

identifying a number of the at least one of the more than one routers that are closest to a router that the at least one packet was known to transit; and responsive to the number of the at least one of the more than one routers that are closest to the router that the at least one packet was known to transit being one, identifying said one of the plurality of candidate ingress routers that is closest to the router that the at least one packet was known to transit, as the ingress provider edge router.

3. The method of claim 2, additionally comprising, responsive to the at least one of the more than one routers that are closest to the router that the at least one packet was known to transit being more than one, identifying a plurality of the at least one of the more than one routers that are closest to the outer that the at least one packet was known to transit as at least one ingress provider edge router.

4. The method of claim 2, additionally comprising, responsive to the at least one of the more than one routers that are closest to the router that the at least one packet was known to transit being more than one, identifying one of the at least one of the more than one routers that are closest to the router that the at least one packet was known to transit, as the ingress provider edge router.

5. The method of claim 1:

additionally comprising identifying whether at least one of the at least one of the plurality of candidate ingress routers that correspond to the customer, also route through a router, interior to a provider of which the candidate provider edge routers reside at an edge, through which the packet is known to have traversed; and wherein the identifying said one of the plurality of candidate ingress routers corresponding to the customer independently of packets routed by the at least one router as the ingress provider edge router, is additionally responsive to the identifying whether at least one of the at least one of the plurality of candidate ingress routers that correspond to the customer, also route through the router, interior to the provider of which the candidate provider edge routers reside at the edge, through which the packet is known to have traversed step.

6. A system for identifying from a plurality of candidate ingress routers, at least one ingress provider edge router of at least one packet, comprising:
- a customer name identifier having an input for receiving a first set of information about the at least one packet and information about customer names, the customer name identifier for, after at least one packet has been sent through at least a part of a network, said part through which said at least one packet has been sent sharing traffic from a plurality of customers, identifying a customer corresponding to the at least one packet, before said ingress router of the network used to transport the at least one packet has been identified, and for providing at an output an identifier of said customer;
- a VRF for customer identifier having an input coupled to the customer name identifier output for receiving the identifier of the customer, and coupled for receiving information relating at least some of the plurality of candidate routers to customer identifiers, the VRF for customer identifier for identifying at least one of the plurality of candidate ingress routers as corresponding to the customer responsive to the identifier of the customer and the information relating at least some of the plurality of candidate routers to customer identifiers and independently of packets routed by the at least one router for providing at an output a first indication of the at least one of the plurality of candidate routers identified;
- an ingress router manager having an input coupled to the VRF for customer identifier for receiving the first indication, the ingress router manager for, responsive to a number of the at least one of the plurality of candidate ingress routers corresponding to the customer independently of packets routed by the at least one router being one, identifying at an output said one of the plurality of candidate ingress routers corresponding to the customer independently of packets routed by the router as the ingress provider edge router;
- wherein the ingress router manager is additionally for, responsive to the number of the at least one of the plurality of candidate ingress routers corresponding to the customer independently of packets routed by the at least one router being more than one, providing a first signal at the ingress router manager output;
- the system additionally comprising a route target for customer/source identifier having an input coupled to the ingress router manager input for receiving the first signal, and coupled for receiving a second set of information about the at least one packet comprising an address, information about route targets and addresses associated therewith for at least some of the plurality of candidate provider edge routers, and coupled to the VRF for customer output for receiving the first indication, the route target for customer/source identifier for, responsive to the first signal, identifying at least one of the at least one of the more than one routers that have a route target for said customer corresponding to an address of the at least one packet, responsive to the second set of information about the at least one packet and the information about route targets and addresses and for providing at an output a second indication of the at least one router it identifies; and
- wherein the ingress router manager input is additionally coupled to the route target for customer/source identifier output for receiving the second indication, and the ingress router manager is additionally for, responsive to a number of the at least one of the more than one routers that have the route target for said customer corresponding to the address of the at least one packet being one, identifying at the ingress router manager output said one of the plurality of candidate ingress routers corresponding to the customer independently of packets routed by the at least one router and having a route target for said customer corresponding to the address of the at least one packet as the ingress provider edge router;
- wherein the ingress router manager is additionally for, responsive to the number of the at least one of the more than one routers that have the route target for said customer corresponding to the address of the at least one packet being more than one, providing a second signal at the ingress router manager output;
- the system additionally comprising a most specific destination address for route target identifier having an input coupled to the ingress router manager for receiving the second signal, and coupled for receiving an address of the at least one packet and address information about at least some of the candidate routers, the most specific destination address for route target identifier for, responsive to the second signal, identifying at least one of the at least one of the more than one routers that have a route target for said customer corresponding to a most specific address of the at least one packet and for providing a third indication of the at least one router identified; and
- wherein the ingress router manager input is additionally coupled to the most specific destination address for route target identifier for receiving the third indication, and the ingress router manager is additionally for, responsive to a number of the at least one of the more than one routers that have the route target for said customer corresponding to the most specific address of the at least one packet being one, identifying at the ingress router manager output said one of the plurality of candidate ingress routers corresponding to the customer independently of packets routed by the at least one router and having a route target for said customer corresponding to the most specific address of the at least one packet as the ingress provider edge router.

7. The system of claim 6:
- wherein the ingress router manager is additionally for, responsive to the number of the at least one of the more than one routers that have the route target for said customer corresponding to the most specific address of the at least one packet being more than one, providing a third signal at the ingress router manager output;
- additionally comprising a nearest identifier having an input coupled to the ingress router manager output for receiving the third signal, and coupled to the most specific destination address for route target identifier output for receiving the third indication, and coupled for receiving topology information regarding at least a router the at least one packet was known to transit and the routers corresponding to the third indication, the nearest identifier for identifying at least one of the at least one of the more than one routers corresponding to the third indication that are closest to the router that the at least one packet was known to transit and for providing at an output a fourth indication of the at least one router identified; and
- the ingress router manager input is coupled to the nearest identifier output for receiving the fourth indication, and the ingress router manager is additionally for, responsive to a number of the at least one of the more than one routers that are closest to the router that the at least one packet was known to transit being one, identifying at the ingress router manager output said one of the plurality of candidate ingress routers that is closest to the router that the at least one packet was known to transit as the ingress provider edge router.

8. The system of claim 7:
wherein the ingress router manager is additionally for, responsive to the at least one of the more than one routers that are closest to the router that the at least one packet was known to transit being more than one, providing a fourth signal at the ingress router manager output;
additionally comprising a marked selector having an input coupled to the nearest identifier output for receiving the fourth indication, the marked selector for identifying a plurality of the at least one of the more than one routers that are closest to the router that the at least one packet was known to transit as an ingress router, and providing at an output a fifth indication of the plurality of routers identified; and
wherein the ingress router manager input is additionally coupled to the marked selector output for receiving the fifth indication, and the ingress router manager is additionally for identifying at the ingress router manager output identifiers of the routers corresponding to the fifth indication.

9. The system of claim 7:
wherein the ingress router manager is additionally for, responsive to the at least one of the more than one routers that are closest to the router that the at least one packet was known to transit being more than one, providing a fourth signal at the ingress router manager output;
additionally comprising a marked selector having an input coupled to the nearest identifier output for receiving the fourth indication, the marked selector for identifying one of the at least one of the more than one routers that are closest to the router that the at least one packet was known to transit as the ingress router, and providing at an output a fifth indication of the plurality of routers identified; and
wherein the ingress router manager input is additionally coupled to the marked selector output for receiving the fifth indication, and the ingress router manager is additionally for identifying at the ingress router manager output an identifier of the router corresponding to the fifth indication.

10. The system of claim 6, wherein:
the VRF for customer identifier input is coupled for receiving information describing routes, in a provider network having the plurality of candidate provider edge routers at its edge, used to route messages; and
the VRF for customer identifier identifies at least one of the plurality of candidate ingress routers additionally responsive to said routes received at the VRF for customer identifier input.

11. A computer program product comprising a non-transitory computer useable medium having computer readable program code embodied therein for identifying from a plurality of candidate ingress provider edge routers, at least one ingress provider edge router of at least one packet, the computer program product comprising computer readable program code configured to cause a computer system to:
after at least one packet has been sent through at least a part of a network, said part through which said at least one packet has been sent sharing traffic from a plurality of customers, identify at a computer system coupled to the network, a customer corresponding to the at least one packet, before identifying at the computer system said ingress router of the network used to transport the at least one packet;
identify at least one of the plurality of candidate ingress routers as corresponding to the customer independently of packets routed by the at least one router; and
responsive to a number of the at least one of the plurality of candidate ingress routers corresponding to the customer independently of packets routed by the at least one router being one, identify said one of the plurality of candidate ingress routers corresponding to the customer, independently of packets routed by the at least one router as the ingress provider edge router;
additionally comprising computer readable program code configured to cause the computer system to, responsive to the number of the at least one of the plurality of candidate ingress routers corresponding to the customer independently of packets routed by the at least one router being more than one:
identify a number of the at least one of the more than one routers that have a route target for said customer corresponding to an address of the at least one packet; and
responsive to the number of the at least one of the more than one routers that have the route target for said customer corresponding to the address of the at least one packet being one, identify said one of the plurality of candidate ingress routers corresponding to the customer independently of packets routed by the at least one router and having a route target for said customer corresponding to the address of the at least one packet as the ingress provider edge router;
additionally comprising computer readable program code configured to cause the computer system to, responsive to the number of the at least one of the more than one routers that have the route target for said customer corresponding to the address of the at least one packet being more than one:
identify a number of the at least one of the more than one routers that have a route target for said customer corresponding to a most specific address of the at least one packet; and
responsive to the number of the at least one of the more than one routers that have the route target for said customer corresponding to the most specific address of the at least one packet being one, identify said one of the plurality of candidate ingress routers corresponding to the customer independently of packets routed by the at least one router and having a route target for said customer corresponding to the most specific address of the at least one packet as the ingress provider edge router.

12. The computer program product of claim 11, additionally comprising computer readable program code configured to cause the computer system to, responsive to the number of the at least one of the more than one routers that have the route target for said customer corresponding to the most specific address of the at least one packet being more than one:
identify a number of the at least one of the more than one routers that are closest to a router that the at least one packet was known to transit; and
responsive to the number of the at least one of the more than one routers that are closest to the router that the at least one packet was known to transit being one, identify said one of the plurality of candidate ingress routers that is closest to the router that the at least one packet was known to transit, as the ingress provider edge router.

13. The computer program product of claim 12, additionally comprising computer readable program code configured to cause the computer system to, responsive to the at least one of the more than one routers that are closest to the router that the at least one packet was known to transit being more than one, identify a plurality of the at least one of the more than one routers that are closest to the router that the at least one packet was known to transit as an ingress router.

14. The computer program product of claim 12, additionally comprising computer readable
program code configured to cause the computer system to, responsive to the at least one of the more than one routers that are closest to the router that the at least one packet was known to transit being more than one, identify one of the at least one of the more than one routers that are closest to the router that the at least one packet was known to transit as the ingress router.

15. The computer program product of claim 11, additionally comprising computer readable program code configured to cause the computer system to identify whether at least one of the at least one of the plurality of candidate ingress routers that correspond to the customer, also route through a router, interior to a provider of which the candidate provider edge routers reside at an edge, through which the packet is known to have traversed; and wherein the computer readable program code configured to cause the computer system to identify said one of the plurality of candidate ingress routers corresponding to the customer independently of packets routed by the at least one router as the ingress provider edge router, are additionally responsive to the computer readable program code configured to cause the computer system to identify whether at least one of the at least one of the plurality of candidate ingress routers that correspond to the customer, also route through the router, interior to the provider of which the candidate provider edge routers reside at the edge, through which the packet is known to have traversed.

* * * * *